United States Patent
Anderson et al.

(10) Patent No.: US 6,608,551 B1
(45) Date of Patent: Aug. 19, 2003

(54) LOW-COST RADIO REPLACEMENT UTILIZING RFID TECHNOLOGY

(75) Inventors: James A. Anderson, Everett, WA (US); Christopher A. Wiklof, Everett, WA (US)

(73) Assignee: Intermec IP Corp, Woodland Hills, CA (US)

( * ) Notice: Subject to any disclaimer, the term of this patent is extended or adjusted under 35 U.S.C. 154(b) by 0 days.

(21) Appl. No.: 09/394,241

(22) Filed: Sep. 13, 1999

(51) Int. Cl.[7] .............................. H04Q 5/22; G08B 5/22
(52) U.S. Cl. ................ 340/10.51; 340/572.1; 340/825.36; 340/10.1
(58) Field of Search .................... 340/10.51, 10.5, 340/10.1, 572.1, 7.27, 825.36, 825.49, 825.69, 825.72; 455/422, 423, 425

(56) References Cited

U.S. PATENT DOCUMENTS

| | | | |
|---|---|---|---|
| 4,782,345 A | 11/1988 | Landt | 343/727 |
| 4,816,839 A | 3/1989 | Landt | 343/795 |
| 5,455,575 A * | 10/1995 | Schuermann | 342/42 |
| 5,629,981 A * | 5/1997 | Nerlikar | 340/825.34 |
| 5,686,902 A * | 11/1997 | Reis et al. | 340/825.49 |
| 5,767,789 A | 6/1998 | Afzali-Ardakani et al. | 340/825.54 |
| 5,825,806 A | 10/1998 | Tuttle et al. | 375/200 |
| 5,864,580 A * | 1/1999 | Lowe et al. | 340/825.54 |
| 5,914,671 A * | 6/1999 | Tuttle | 340/825.49 |
| 6,172,596 B1 * | 1/2001 | Cesar et al. | 340/10.41 |
| 6,246,882 B1 * | 6/2001 | Lachance | 455/456 |

FOREIGN PATENT DOCUMENTS

| | | |
|---|---|---|
| EP | 0 405 074 | 1/1991 |
| EP | 0 785 527 | 7/1997 |
| GB | WO 90/05960 | 5/1990 |

* cited by examiner

*Primary Examiner*—Donnie L. Crosland
(74) *Attorney, Agent, or Firm*—Orum C Roth

(57) ABSTRACT

A radio replacement using RFID technology in an RF-enabled device is provided. The RF-enabled handheld, portable, or otherwise mobile device is equipped with an RFID tag having read and write capability. Data exchange occurs between the RFID tag and a network of RFID interrogators placed to provide adequate coverage of the area over which the device might move. As a result of replacing a full functioning transmitting/receiving radio with an RFID tag, the cost of the RF-enabled device could be significantly reduced, its battery life could be extended, and it could operate in a frequency band that does not require FCC approval. Additionally, this invention could provide tracking and access control using the RFID tag and interrogators.

20 Claims, 7 Drawing Sheets

LOW-COST RADIO REPLACEMENT UTILIZING RFID TECHNOLOGY

BACKGROUND OF THE INVENTION

1. Field of the Invention

The present invention relates to data communication devices, and in particular to a wireless data communications system utilizing radio frequency identification technology.

2. Description of Related Art

In the automated identification and data capture industry, it is known to operate a wireless network that includes a plurality of terminals that communicate over a radio frequency (RF) channel with a host computer. The terminals may be portable, such as hand-held data-collection terminals and pagers, and generally include an input mechanism such as a keyboard for manual input of information or a scanner for reading barcode information. These terminals may be used in a variety of applications such as inventory control, shipping and receiving, and security management. In operation, each terminal communicates with the host computer over a conventional bi-directional radio system. A typical bi-directional radio is capable of receiving and transmitting RF signals in accordance with a selected RF protocol, such as polling or contention, which allows multiple terminals to communicate with the same host computer.

The use of a conventional bi-directional radio of these prior art systems has certain drawbacks. For example, the radio can be relatively expensive, especially in terminals designed for simple, short range wireless communication. Further, the terminal's battery, in addition to powering the terminal's data collection facilities, must also provide power sufficient to transmit and receive radio signals to and from the host computer, resulting in additional drain on the battery. A further drawback is that these radio systems often use a licensed frequency band requiring Federal Communications Commission ("FCC") approval.

Accordingly, a low-cost wireless data communications system that avoids the drawbacks of conventional bi-directional radio systems would be desirable.

SUMMARY OF THE INVENTION

In accordance with the teachings of the present invention, a wireless data communications system includes at least one portable device, such as a wireless data collection terminal, which is equipped with a programmable RFID tag. Generally, an RFID tag is less expensive than a conventional bidirectional radio, will cause less battery drain, and typically operates in an unlicensed frequency band that does not require FCC approval. Thus, the portable device of the present invention avoids many of the drawbacks of conventional RF systems. In addition, each portable device may include an input device, such as a keyboard or barcode scanner, for collecting data, a memory for storing the collected data, and a display.

The wireless data communications system further includes at least one RFID interrogator connected to a host computer. In operation, the RFID interrogator polls for RFID tags, and when an RFID tag is detected, the data stored in the memory of the portable device may be uploaded to the RFID interrogator through the RFID tag. Likewise, data could be downloaded to the data collection terminal via the same RFID interrogator. The data downloaded to the portable device could include visual display data for use on the display of the portable device, audio data for playback over a speaker of the portable device, executable code to customize the processing logic of the portable device, data to be used in subsequent processing by the portable device, and other types of data.

In another embodiment, the location of each portable device in the wireless data communications system may be determined and tracked by a network of interrogators. Each interrogator has an associated operating range ("cell") within which a data collection terminal may be interrogated, and the interrogators are positioned so that their respective cells provide adequate coverage of the area over which each portable device might move during communications. When a portable device is within a particular interrogator's cell, a communications link between the interrogator and the portable device may be established. A search algorithm running on the host computer may be used to determine the cell location of the portable device and track the portable device's movement through the cells of the covered area. In addition, the location of the portable device within each cell can also be determined by measuring the signal propagation delay between the portable device and each of three or more interrogators associated with neighboring cells. The location of the portable device can be used by the host computer to control access privileges for the portable device, to send messages to a user closest to a particular area, to select proprietary data for download at particular user locations, or for any other purpose in which location of the portable device or user may be desirable.

A more complete understanding of Low-Cost Radio Replacement Utilizing RFID Technology will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF A PREFERRED EMBODIMENT

Figure 1:
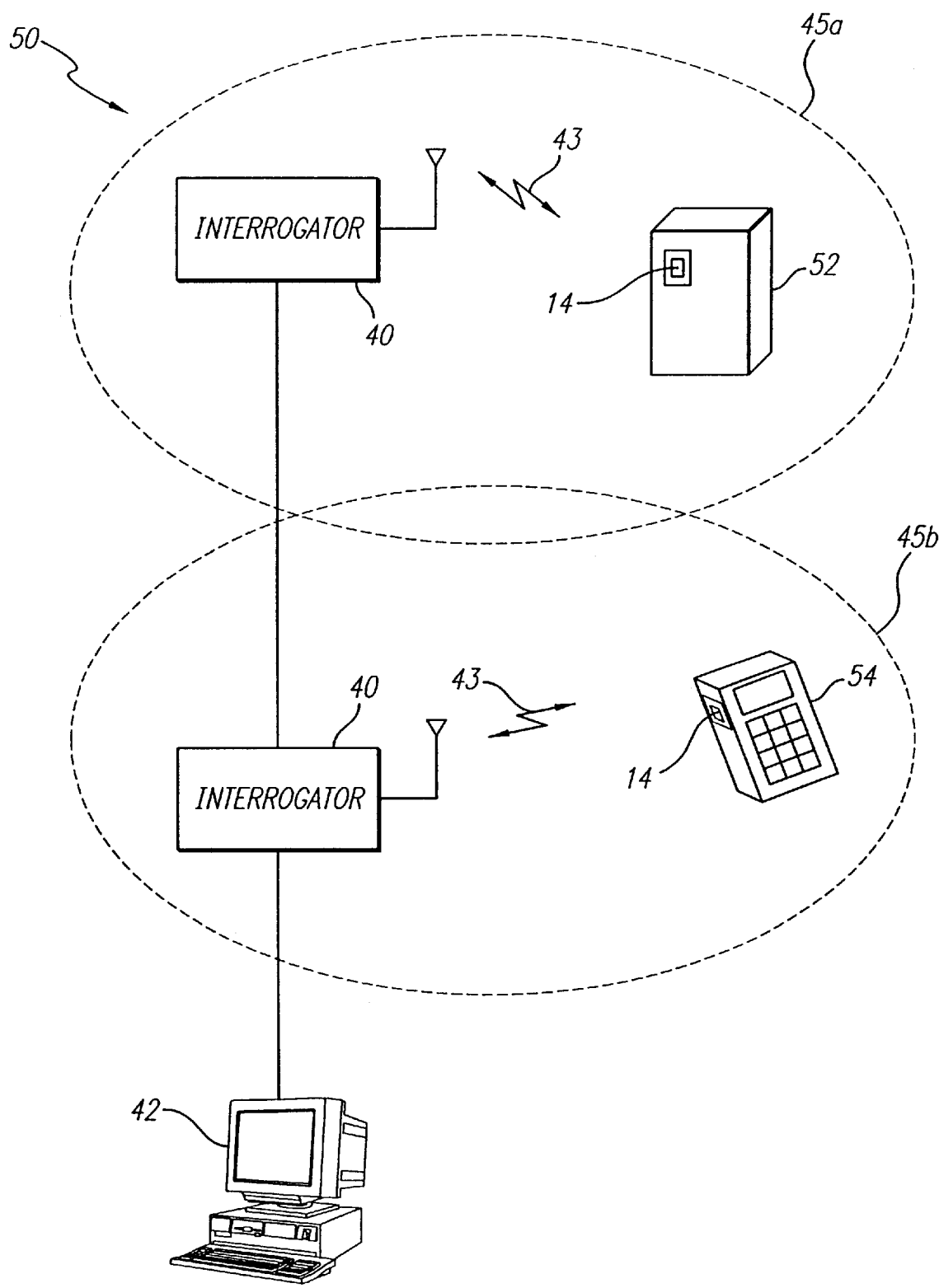
FIG. 1 is a typical arrangement of an RF interrogator network according to an embodiment of the present invention.

The present invention satisfies the need for a low-cost wireless data communications system the at avoids the drawbacks of conventional radio communications systems. In the detailed description that follows, like element numerals are used to describe like elements illustrated in one or more of the figures.

A preferred embodiment of a wireless data communications system will now be described with reference to FIG. 1. According to a preferred embodiment of the present invention, radio frequency identification technology is utilized in a typical handheld, portable, or otherwise mobile device to replace a conventional radio system. RFID technology is known in the prior art as an alternative to bar code technology for identifying objects. Similar to a printed bar code label, an RFID tag may be programmed to store unique information that identifies an object, such as a package for shipping, to which the RFID tag is attached.

A wireless data communications system of the preferred embodiment includes a plurality of wireless devices, such as pager 52 and data-collection terminal 54, and at least one host computer 42. Unlike the prior art which uses conventional radio devices for wireless communications between each wireless device and the host computer, each wireless device of the preferred embodiment includes an RFID tag 14. Data exchange occurs between the RFID tag 14 in a wireless device and a network of RFID interrogators 40, connected to the host computer 42, and positioned to provide adequate coverage of the area over which each wireless device might move during communications. The RFID interrogators 40 communicate with the RFID tags 14 through an antenna via RF links, which are represented symbolically by links 43. Alternatively, each RFID interrogator may selectively utilize a plurality of antennas. Use of the RFID tag 14 extends the device's battery life and typically does not require FCC licensing to operate in a particular frequency band. Furthermore, as will be discussed below, the preferred embodiment can provide location tracking and access control using the RFID tag 14 and RFID interrogators 40.

Figure 2:
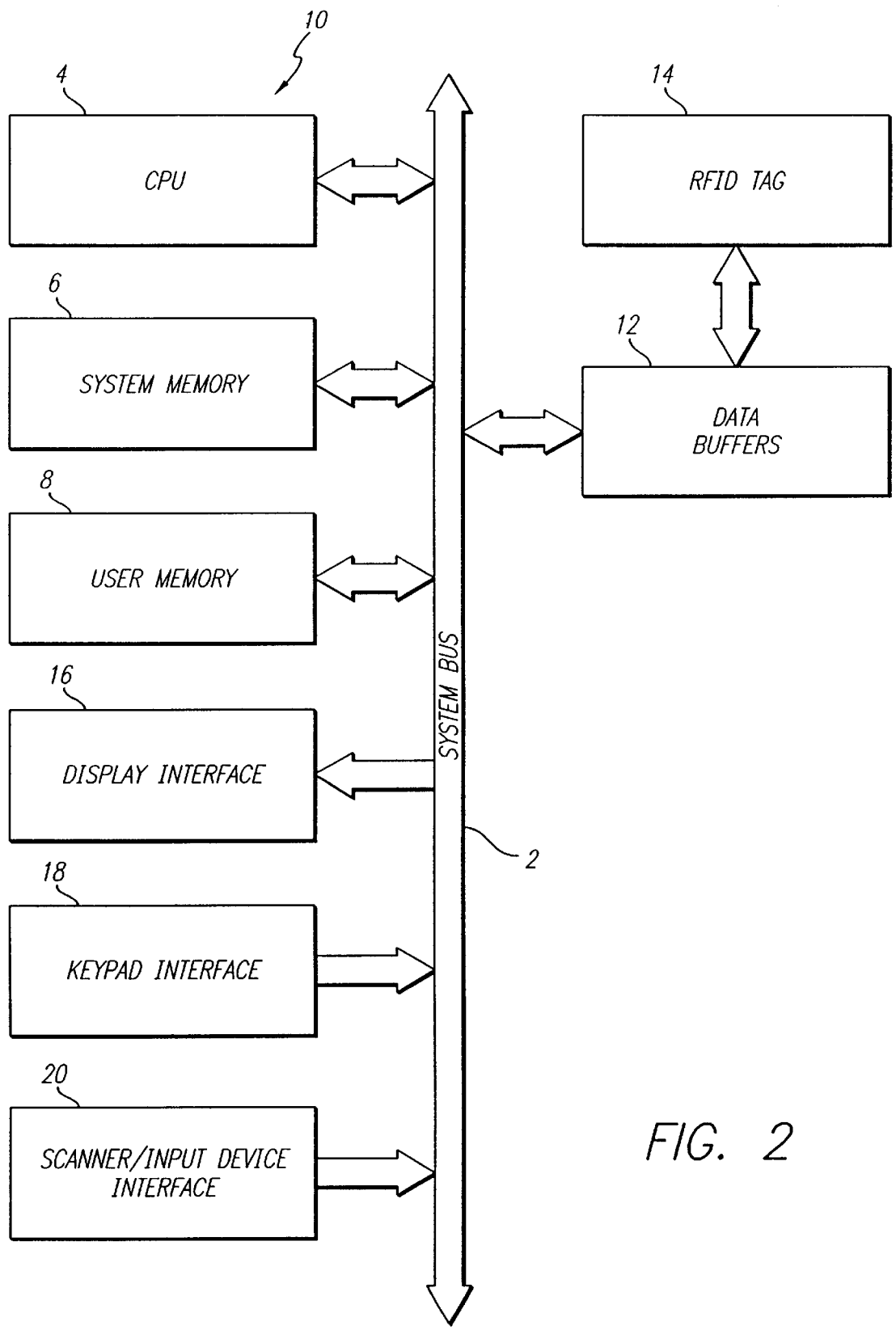
FIG. 2 is a block diagram of a portable device using an RFID tag according to an embodiment of the present invention.

Referring to FIG. 2, a block diagram of a wireless device using an RFID tag 14 in accordance with an embodiment of the present invention is illustrated. The wireless device 10, which can be, for example, a data collection terminal, comprises a system bus 2 to which a central processing unit ("CPU") 4, a system memory 6, a user memory 8, a display interface 16, a keypad interface 18, an input device interface 20, and data buffers 12 are connected. The RFID tag 14, having read/write capability, is connected to the data buffers 12. Alternatively, the data buffers 12 may be located within the RFID tag 14. It should be noted that the display interface 16, the keypad interface 18 and the input device interface 20 connected to the system bus 2 are optional and are not required components the wireless device 10.

The display interface 16 may comprise a liquid crystal display. For data entry, the keypad interface 18, as known in the art, may comprise a plurality of alphanumeric keys each adapted to generate a character signal upon its depression. The input device 20 may comprise a scanner such as a bar code scanner, which reads and converts data into an electrical signal by analyzing the light reflected from the data, as known in the art. The data buffers 12 can be, for example, in and out or bidirectional FIFOs onto which the collected data can be written. The system memory 6 may comprise a read only memory ("ROM") and store control programs for the CPU 4. The user memory 8 may comprise a random access memory ("RAM") which has a work area for use in controlling the wireless device 10 and stores data entered by the user. The wireless device 10 may receive the data and commands and the CPU 4 could execute the commands such as to obtain source data stored in memory, run programs stored in memory, and thereby control the wireless device 10.

In traditional RF handheld devices, data is actively transmitted to the network whenever input data is available. In the present invention, the wireless device 10 having the RFID tag 14 would collect data normally, for example, via the input device 20 or the keypad interface 18, but the data would then be written to the memory data buffers 12 to await uploading to the network. As will be described below, the wireless device 10 is polled continuously for data by the interrogator network 50 and the data is uploaded via the interrogator network 50. Likewise, data could be downloaded to the wireless device 10 via the same interrogator network to reconfigure the device, reload application software, or relay messages to the user of the wireless device 10. Generally, the data transferred between the RFID tag 14 and the interrogator network 50 may include display data, audio data, executable data, and/or data for local processing. Further, the wireless device 10 could provide audible and/or visual feedback to the user, e.g., an alarm by way of a beep and/or a blinking display, whenever data is uploaded or downloaded or if the data buffers are full and need to be emptied.

Figure 7A:
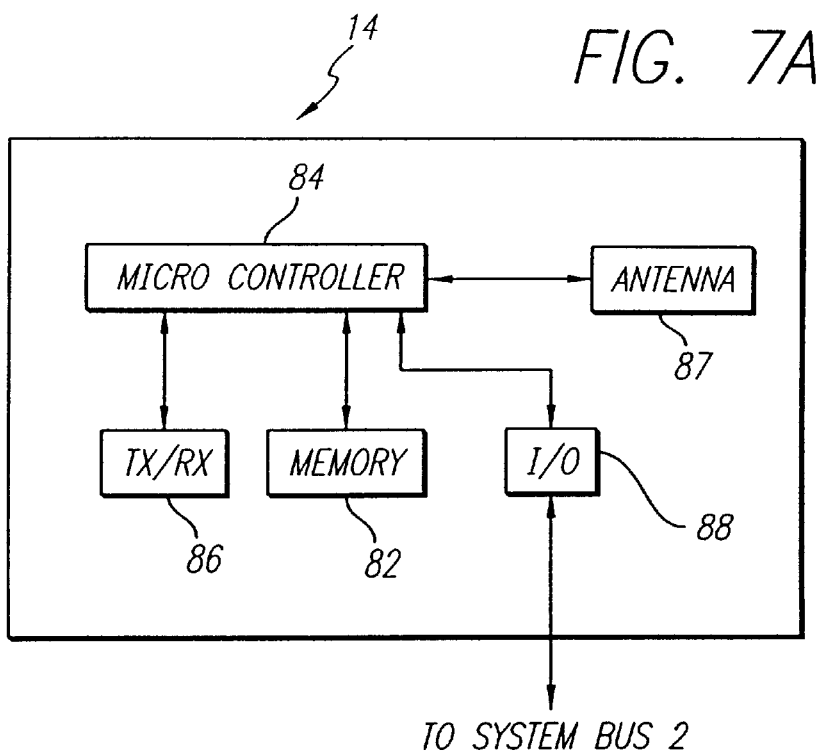
FIG. 7A shows a block diagram of an RFID tag including a memory according to an embodiment of the present invention.
Figure 7B:
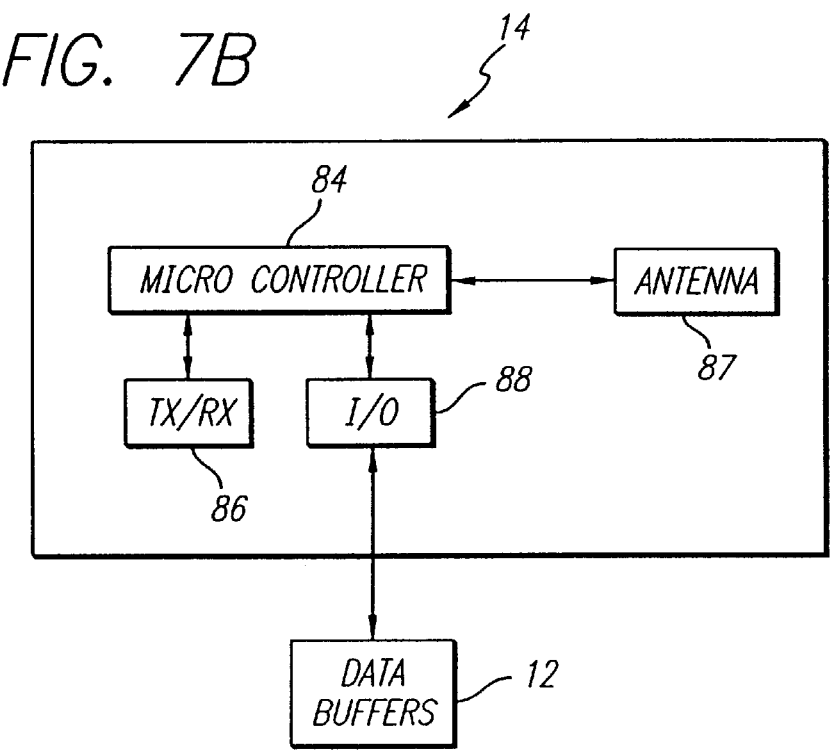
FIG. 7B shows a block diagram of an RFID tag without a memory according to an embodiment of the present invention.

FIGS. 7A and 7B show two embodiments of the RFID tag 14. In FIG. 7A, the RFID tag 14 generally includes a memory 82, a microcontroller 84, an antenna 87, a transmitter/receiver 86, and an input/output ("I/O") section 88. The I/O 88 is coupled to the system bus 2, allowing data to be transferred between the RFID tag 14 and other elements of the device 10 through the system bus 2. The memory 82 may comprise an electronic memory device for storing digital information, a portion of which may be used as a data buffer. The embodiment of the RFID tag shown in FIG. 7B corresponds to the embodiment of the wireless device 10 illustrated in FIG. 2. The RFID 14 of FIG. 7B generally comprises the microcontroller 84, the transmitter/receiver 86, the antenna 87, and the I/O 88. Instead of a memory being internal to the RFID tag, the I/O 88 is connected to external data buffers 12, which are in turn connected to the system bus 2 as shown in FIG. 2. The data buffer acts as an address extender, allowing the CPU 4 to access data by a corresponding address.

In operation, an RFID interrogator 40 of the preferred embodiment produces a radio frequency magnetic field within an operating range, illustrated by cells 45a and 45b in FIG. 1, respectively, in order to read information from a wireless device that is physically within the operating range. When a wireless device, such as data-collection terminal 54, enters the magnetic field, the RFID tag 14 absorbs energy from the field, which allows the RFID tag 14 to transmit stored data to, or download data from, the local interrogator 40. Under a technique referred to as "backscatter modulation," the RFID tag 14 transmits stored data back to the interrogator 40 by reflecting varying amounts of the electromagnetic field provided by the RFID interrogator 40 by modifying its antenna matching impedance. Through similar techniques, as known in the art, the interrogator 40 may upload data from an RFID tag 14, or download data to a particular RFID tag 14. The RFID tag 14 can therefore operate independently of the frequency of the energizing field, and as a result the interrogator 40 may operate at multiple frequencies so as to avoid RF interference, such as using frequency hopping spread spectrum modulation techniques. Because the RFID tags 14 do not include a radio transceiver, they can be manufactured in very small, lightweight and inexpensive units. Passive RFID tags 14 are particularly cost effective because they lack a power source, and draw power from the RF energy transmitted from the interrogators 40.

Figure 3:
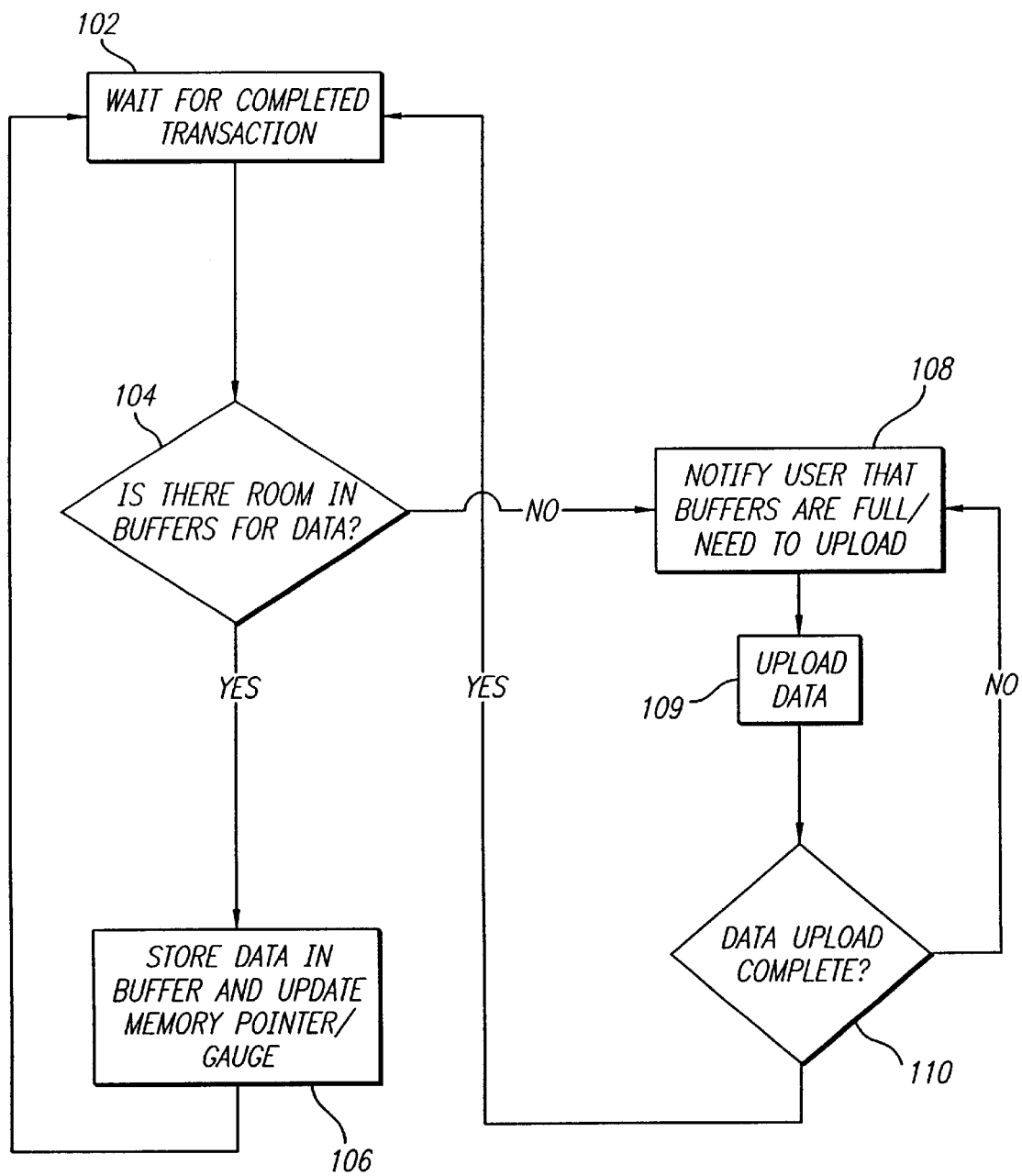
FIG. 3 is a flow chart of a device/network transaction flow according to an embodiment of the present invention.

Referring now to FIG. 3, a flow chart of a wireless device/network transaction flow according to an embodiment of the present invention is provided. In step 102, the wireless device waits for a completed transaction, e.g., the collection of data via the input device 20 or the keypad interface 18. In step 104, the process determines if there is room in the data buffers for data. If there is room in the data buffers for data, the process goes to step 106. Alternatively, if there is no room in the data buffers, the process goes to step 108. In step 106, data is stored in the buffers and a memory pointer/gauge is updated. The memory pointer or gauge indicates how much memory remains inside the buffers. In step 108, the user is notified that the buffers are full and uploading is needed. As noted above, the wireless device could provide audible or visual feedback to the user to indicate that the buffers are full. In step 109, the data upload is performed. In step 110, the process checks if the upload of data is complete. If the upload is complete, the process returns to step 102 to wait for another completed transaction. If the upload of data is not complete, the process returns to step 108 to notify the user that the data in the buffers still needs to be uploaded.

Figure 4:
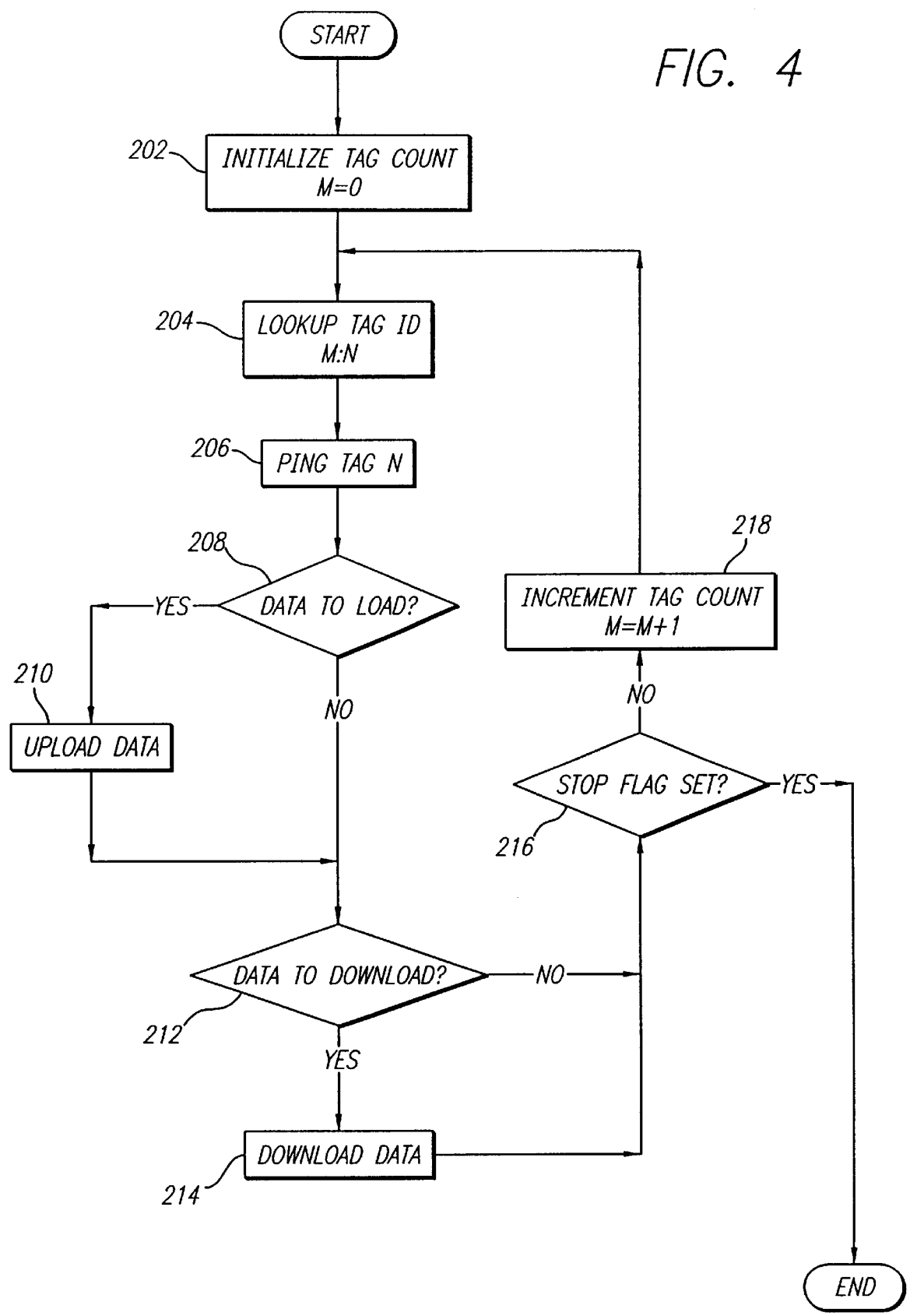
FIG. 4 is a flow chart of an interrogator polling logic according to an embodiment of the present invention.

Referring now to FIG. 4 a flow chart of an interrogator polling logic according to an embodiment of the present invention is illustrated. The wireless device 10 is continuously polled for data by the interrogator network 50 and the data is uploaded via the interrogator network. Likewise, data may also be downloaded to the wireless device 10 via the interrogator network 50. In step 202, the process initializes an RFID tag count and sets a counter M equal to zero. In step 204, the process looks for the RFID tag identification ("ID") and marks the current transaction in the format M:N where M is the current value of the counter and N is the identifying data for the RFID tag in a particular wireless device. In step 206, the process pings or checks if the RFID tag N of a particular wireless device is there, i.e., the process goes back and forth until it finds the RFID tag N. In step 208 the process checks if there is data to upload from the tag N. If there is no data to upload, the process goes to step 212. If there is data to upload, the process goes to step 210. In step 210 the data is uploaded. In step 212, the process checks if there is data to download to tag N. If there is data to download, the process goes to step 214. If there is no data to download, the process goes to step 216. In step 214, the data is downloaded to tag N. In step 216, the process checks if the stop flag is set. If the stop flag is set, the process ends. If the stop flag is not set, the process goes to step 218. In step 218, the process increments the tag count and sets M=M+1. The process is then repeated from step 204. Thus, the data communication device uses a polled, asymmetric architecture that enables the use of a very inexpensive end device radio interface. The wireless device using the RFID tag offers more timely data exchange than the traditional batch device at minimal or no extra cost. Also, the device could provide location tracking and access control using the RFID tag and interrogators, as described below.

Figure 5:
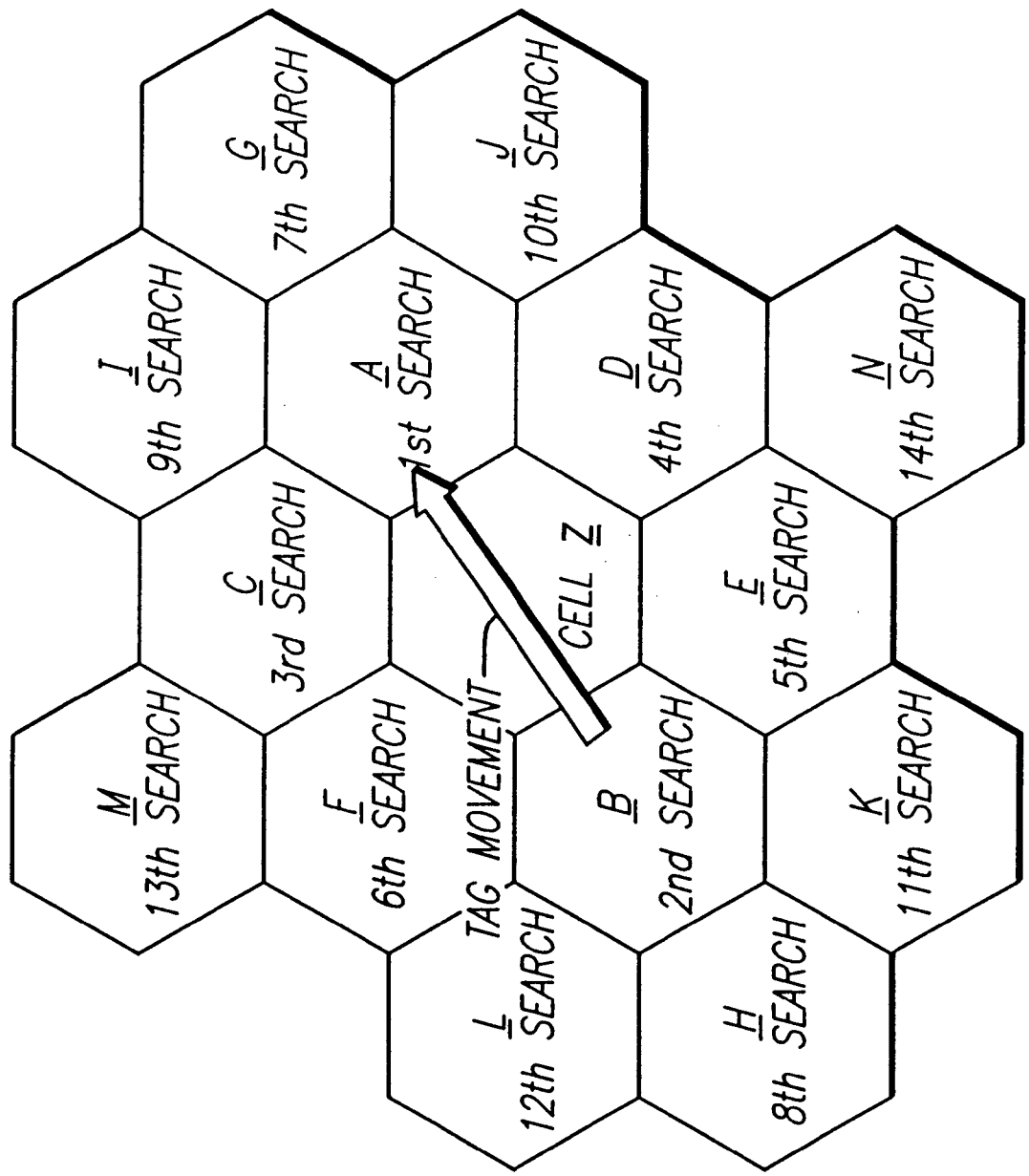
FIG. 5 is a diagram of a cell search strategy according to an embodiment of the present invention.
Figure 6:
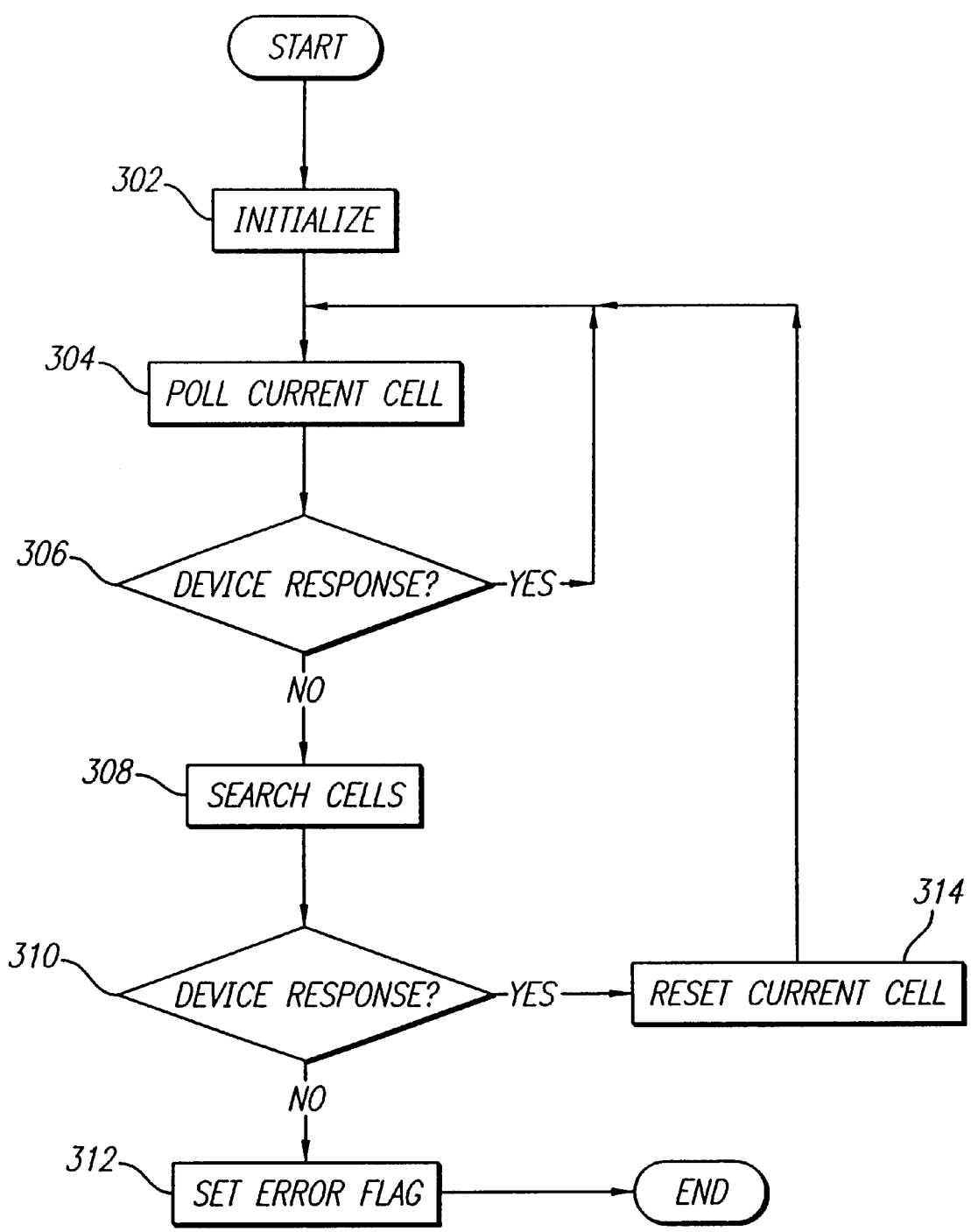
FIG. 6 is a flow chart of device location tracking according to an embodiment of the present invention.

The location of the wireless device may be determined to a cell granularity level in the operating area by using a search algorithm as illustrated in FIGS. 5 and 6. FIG. 5 provides a diagram of a cell search strategy according to an embodiment of the present invention. The diagram illustrates an area divided into cells A, B, C, D, E, F, G, H, I, J, K, L, M, N and Z within which an RFID tag might move, each cell representing an operating range of an RFID interrogator. An arrow labeled "TAG MOVEMENT" indicates a possible direction of the movement of the RFID tag going from cell B to cell A, through cell Z. The RFID tag, which is housed in a handheld, portable or mobile device exchanges data with a network of RFID interrogators placed to provide adequate coverage of the area in which the device might move. For illustrative purposes, the RFID tag is first located within cell Z, from which it is moved. To locate the RFID tag, the algorithm identifies the most likely cell to which the tag could have moved, thus, the algorithm conducts a first search in cell A, which is next to cell Z along the direction of the arrow. If the tag is not in cell A, the algorithm searches the next most likely cell to which the tag could have moved, thus the algorithm conducts a second search in cell B, which is going backwards from cell Z opposite the direction of the arrow. If the tag is not located in cell B, the algorithm conducts a third search in cell C, which is a neighboring cell above cell Z and possibly the next most likely cell to which the tag could have moved. This search continues through cells D-N until the tag is located or no further cells remain to be searched.

Referring now to FIG. 6, a flow chart of a process for tracking the wireless device location according to an embodiment of the present invention is provided. In step 302, the process is initialized. In step 304, the process polls a current cell. In step 306, the process determines if the wireless device has responded to the polling of the cell. If there is a device response, the process goes to step 304. If there is no device response, the process goes to step 308. In step 308, the process searches the cells, for example, according to the algorithm described above with respect to FIG. 5. In step 310, the process determines if the device responds as a result of the cell search. If the wireless device responds, the process goes to step 314. If the wireless device does not respond, the process goes to step 312. In step 314 the current cell is reset and the process goes to step 304. In step 312, the process sets an error flag, indicating that the wireless device cannot be located, and the process ends.

For location determination of the wireless device finer than the granularity of the cells, signal propagation delay determined by three or more neighboring cells may be used to determine horizontal location. For example, in FIG. 5, if the tag is located in the center of cell Z, cells A, C, and D can be used to measure the signal delay from each of cells A, C and D to cell Z. The measured signal delays are then compared. Since in this example the tag is in the center of cell Z, the signal delays from each of the neighboring cells A, C and D would be equal. This finer location granularity may, in turn, be used to monitor movement within a cell and may be used to determine the cell search strategy. For example, if it is determined that in the beginning a tag is within cell Z in the upper right corner of cell Z, then the next most likely cell to be searched would be, cell A according to the search algorithm as described above with respect to FIG. 5. In a like manner, the host could use wireless device location to control access privileges of a tag and, hence, a user. For example, a user may be issued a wireless device having an RFID tag that includes encoded information regarding access privileges to a particular area for a particular user. Access to the particular area is denied to the user when the RFID tag is located in close proximity to the area to which the encoded information in the RFID tag indicates that the user does not have access privileges. Access is granted to the user when the encoded information in the RFID tag indicates that the user has access privileges to the particular area.

Having thus described a preferred embodiment of a Low-Cost Radio Replacement Utilizing RFID Technology, it should be apparent to those skilled in the art that certain advantages of the aforementioned system have been achieved. It should also be appreciated that various modifications, adaptations, and alternative embodiments thereof may be made within the scope and spirit of the present invention. The invention is further defined by the following claims.

What is claimed is:

1. A wireless data communications systems:
   a host computer;
   an RFID interrogator connected to the host computer, the RFID interrogator adapted to produce a radio frequency magnetic field within a cell; and
   a wireless device, including an RFID tag, an input device, a memory, and data buffers;
   wherein data input through the input device is stored in the data buffers of the wireless device; and
   wherein the RFID tag is adapted to transmit data stored in the data buffers to the host computer, through a wireless communications link between the RFID tag and the RFID interrogator thereby emptying the data buffers, when the device is within the cell.

2. The wireless data communications system of claim 1, wherein the memory is located on the RFID tag.

3. The wireless data communications systems of claim 1, wherein the RFID tag is adapted to receive host data, transmitted to the host computer to the wireless device, through a wireless communications link between the RFID interrogator and the RFID tag, when the wireless device is within the cell.

4. The wireless data communications system of claim 3, wherein the wireless device includes a processor; and
   wherein the host data includes executable code for execution on the processor of the wireless device.

5. The wireless data communications system of claim 3, wherein the wireless device includes a video display; and
   wherein the host data includes visual display data for display on the video display of the wireless device.

6. The wireless data communications system of claim 1, further comprising a plurality of RFID interrogators connected to the host computer, the plurality of RFID interrogators arranged so that their respective cells define a communications area;
   wherein a communications link can be established between the wireless device and the host computer through one of the RFID interrogators when the wireless device is within the communications area.

7. The wireless data communications system of claim 6, wherein the host computer includes program logic for determining the cell location of the wireless device within the communications area.

8. The wireless data communications system of claim 7, wherein the program logic further includes logic for tracking the cellular movement of the wireless device within the communications area.

9. The wireless data communications system of claim 8, wherein the program logic further includes logic for determining the location of the wireless device within its current cell location.

10. The wireless data communications system of claim 9, wherein the program logic includes logic for separately interrogating the wireless device through three RFID interrogators, the three RFID interrogators having associated cells adjacent to the current cell location; and
    wherein the location of the wireless device within its current cell is determined by measuring the signal delays between the RFID tag and each of the three RFID interrogators.

11. A wireless data collection device for exchanging data with the host computer connected to a network of RFID interrogators, the wireless data collection device comprising:
    an input device;
    a data memory;
    data buffers for storing data collected by the input device; and
    an RFID tag connected to the data buffers for transmitting the stored data to the host computer when interrogated by at least one of the RFID interrogators; and for emptying the data buffers.

12. The wireless data collection device of claim 11 wherein the input device is a bar code scanner.

13. The wireless data collection device of claim 11 wherein the RFID tag is adapted to receive data downloaded from the host computer via at least one of the RFID interrogators.

14. The, wireless data collection device of claim 13 further comprising:
    a processor; and
    a program memory for storing program logic for instructing the processor;
    wherein the downloaded data comprises executable code which is stored in the program memory for instructing the processor.

15. The wireless data collection device of claim 14 further comprising:
    a video display; and
    wherein the downloaded data comprises visual display data for display on the video display.

16. A method of tracking a location of a wireless device, said wireless device including an RFID tag and being movable within any one of a plurality of cells, each cell having an associated RFID interrogator adapted to interrogate the RFID tag when physically located within its associate cell, the method comprising the steps of:
    locating the wireless device by sequentially interrogating each cell with its associated interrogator until the wireless device responds;
    polling the current cell until the wireless device stops responding to the current interrogator;
    sequentially interrogating cells adjacent to the current cell until the wireless device is located; and
    repeating the steps of polling and sequentially interrogating for the new cell location.

17. The method of claim 16, wherein the step of polling further comprises the steps of:
    measuring signal propagation delay from each of three interrogators associated with three adjacent cells; and
    comparing the three signal propagation delays to determine the location of the wireless device within the current cell.

18. The method of claim 16, further comprising the step of controlling access privileges of the wireless device based on the location of the RF device.

19. The method of claim 17, wherein data collected by the wireless device may be uploaded to a host computer through the current interrogator and wherein said uploading empties data buffers.

20. The method of claim 17, wherein the step of sequentially interrogating includes the step of:
    determining the most likely new cell location of the wireless device based on the last determined location of the wireless device within the current cell.

* * * * *